(12) United States Patent
Balachandran

(10) Patent No.: US 7,546,301 B1
(45) Date of Patent: Jun. 9, 2009

(54) EFFECTUATING PERSONALIZED, PROCESS-INTEGRATED INFORMATION, COMMUNICATIONS AND ENTERTAINMENT (ICE) SERVICE DELIVERY

(75) Inventor: Shridharan Balachandran, Plano, TX (US)

(73) Assignee: Alcatel Lucent, Paris (FR)

( * ) Notice: Subject to any disclaimer, the term of this patent is extended or adjusted under 35 U.S.C. 154(b) by 357 days.

(21) Appl. No.: 11/205,585

(22) Filed: Aug. 17, 2005

(51) Int. Cl.
*G06F 19/00* (2006.01)
*G06Q 10/00* (2006.01)
*G06Q 30/00* (2006.01)

(52) U.S. Cl. .................. 707/10; 707/101; 705/26; 705/37; 709/201; 709/217

(58) Field of Classification Search .......... None
See application file for complete search history.

(56) References Cited

U.S. PATENT DOCUMENTS

| | | | |
|---|---|---|---|
| 6,038,538 A * | 3/2000 | Agrawal et al. ............... 705/7 |
| 6,411,936 B1 * | 6/2002 | Sanders ...................... 705/10 |
| 6,434,568 B1 | 8/2002 | Bowman-Amuah ..... 707/103 R |
| 6,523,027 B1 | 2/2003 | Underwood ................ 707/4 |
| 6,529,909 B1 | 3/2003 | Bowman-Amuah ......... 707/10 |
| 6,539,396 B1 | 3/2003 | Bowman-Amuah ..... 707/103 R |
| 6,571,282 B1 | 5/2003 | Bowman-Amuah ........ 709/219 |
| 6,609,128 B1 | 8/2003 | Underwood ............... 707/10 |
| 6,640,244 B1 | 10/2003 | Bowman-Amuah ........ 709/207 |
| 2003/0195762 A1 * | 10/2003 | Gleason et al. .............. 705/1 |
| 2004/0193679 A1 | 9/2004 | Tecco et al. |
| 2004/0220910 A1 * | 11/2004 | Zang et al. ................... 707/3 |
| 2004/0225656 A1 * | 11/2004 | Sarkar ....................... 707/9 |
| 2005/0076059 A1 * | 4/2005 | Nomura et al. .......... 707/104.1 |
| 2006/0165040 A1 * | 7/2006 | Rathod et al. ............. 370/335 |
| 2006/0206346 A1 * | 9/2006 | Grand et al. ................ 705/1 |
| 2007/0078525 A1 * | 4/2007 | Chand ...................... 700/18 |
| 2007/0150480 A1 * | 6/2007 | Hwang et al. .............. 707/10 |

FOREIGN PATENT DOCUMENTS

EP 1 367 520 A1 12/2003
WO WO 03/056448 A1 7/2003

OTHER PUBLICATIONS

Adams, Lamont; "Defining Web services in WSDL: A primer"; Building.com; Aug. 1, 2002; http://www.builderau.com.au/architect/webservices/0,390245990.20267053.00.htm; pp. 1-3.
Skonnard, Aaron (notes from article); "Web Services Description Language"; http://msdn.microsoft.com/library/default/asp; 30 pages, Mar. 29, 2005.

* cited by examiner

*Primary Examiner*—Pierre M Vital
*Assistant Examiner*—Christopher P Nofal

(57) ABSTRACT

Method and system for effectuating personalized, process-integrated information, communications and entertainment (ICE) service delivery to enterprise and residential subscribers. In one embodiment, the process-integrated ICE delivery system includes at least one application server disposed as part of a service delivery platform, wherein the at least one application server is interfaced with an enterprise network for hosting one or more service application modules. A process flow management server interfaced with the enterprise network is operable for managing a modularized flow of a business process in the enterprise, wherein the modularized flow includes a number of process blocks, at least a portion of the process blocks each having an interface with one or more service application modules that are activated depending on where a particular project is located.

5 Claims, 7 Drawing Sheets

EFFECTUATING PERSONALIZED, PROCESS-INTEGRATED INFORMATION, COMMUNICATIONS AND ENTERTAINMENT (ICE) SERVICE DELIVERY

BACKGROUND OF THE INVENTION

1. Technical Field of the Invention

The present invention generally relates to communication services. More particularly, and not by way of any limitation, the present invention is directed to a method and system for effectuating personalized, process-integrated information, communications and entertainment (ICE) service delivery.

2. Description of Related Art

Service differentiation and value addition have become two of the most significant factors in defining the relationship between a telecommunications service provider and its subscribers. To maintain a loyal customer base as well as fend off intense competition from cable operators and other non-traditional players, conventional service providers are transforming themselves into providers of triple-play services and other types of bundled services. However, it is becoming increasingly clear that more novel ways of service provisioning will be necessary in order to obtain and retain a customer over a long period of time.

SUMMARY OF THE INVENTION

In one aspect, a scheme is disclosed for effectuating personalized, process-integrated information, communications and entertainment (ICE) service delivery to enterprise and residential subscribers. In one embodiment, the process-integrated ICE delivery system includes at least one application server disposed as part of a service delivery platform, wherein the at least one application server is interfaced with an enterprise network for hosting one or more service application modules. A process flow management server interfaced with the enterprise network is operable for managing a modularized flow of a business process in the enterprise, wherein the modularized flow includes a number of process blocks, at least a portion of the process blocks each having an interface with one or more service application modules that are activated depending on where a particular project is located.

In another aspect, the present invention is directed to a method for providing process-integrated service to a subscriber, comprising: modularizing a process flow associated with the subscriber into a number of process blocks; interfacing one or more service application modules with at least a portion of the process blocks; and invoking appropriate service application modules for a particular project that is managed in accordance with the modularized process flow.

In a further aspect, the present invention is directed to a system for providing process-integrated service to a subscriber, comprising: means for modularizing a process flow associated with the subscriber into a number of process blocks; means for interfacing one or more service application modules with at least a portion of the process blocks; and means for invoking appropriate service application modules for a particular project that is managed in accordance with the modularized process flow. Relatedly, a still further embodiment of the present invention is directed to a system, comprising: means for invoking a communication session as part of a process-integrated service delivery application associated with a modularized process flow of a work project; and means for automatically sharing the communication session's context with additional participants based on the modularized process flow.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
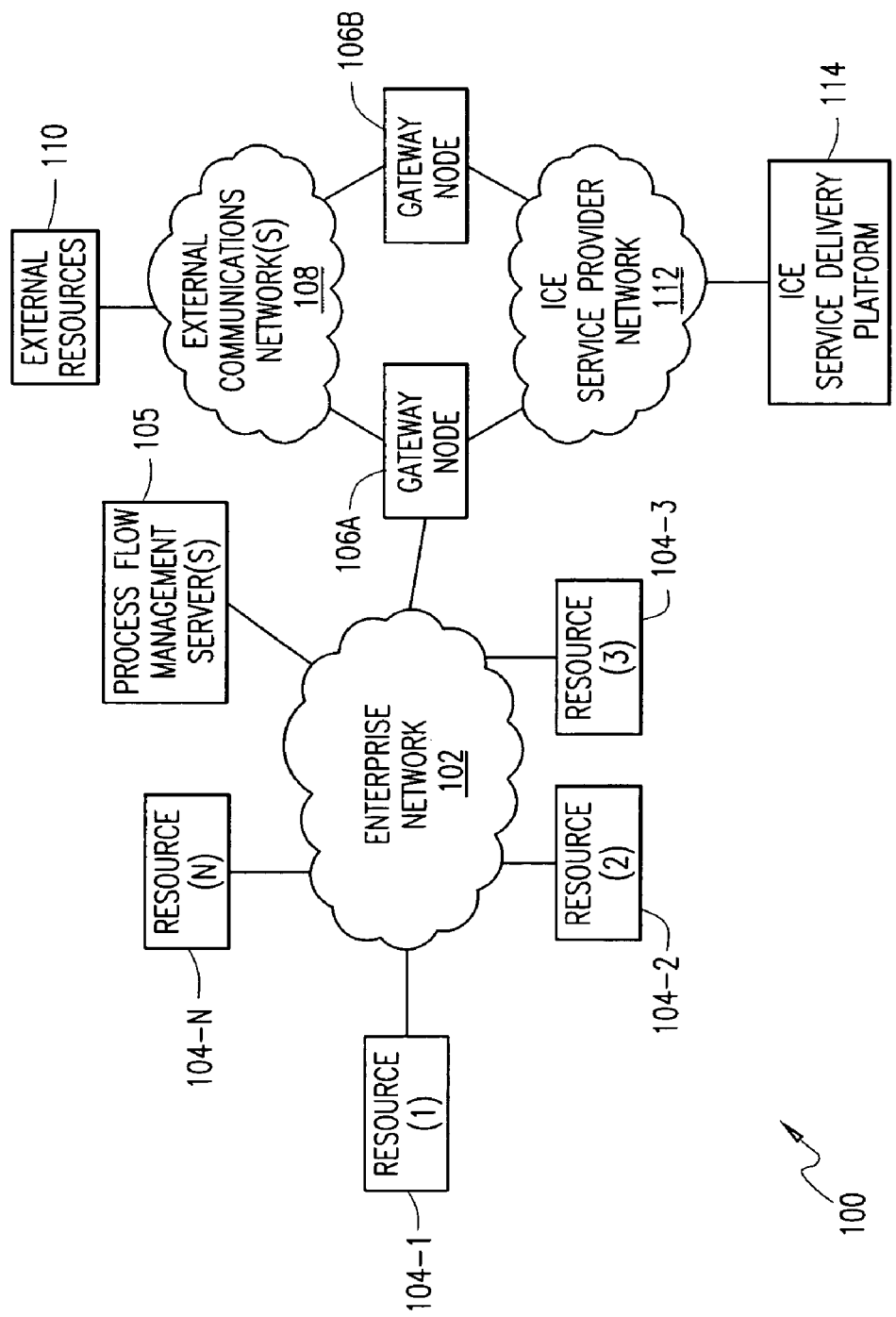
FIG. 1 depicts an exemplary network environment wherein an embodiment of a process-integrated service delivery mechanism may be effectuated in accordance with the teachings of the present invention.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 wherein an embodiment of a process-integrated service delivery mechanism may be effectuated in accordance with the teachings of the present invention for providing process-flow-dependent services to a business enterprise. An enterprise network 102, comprising any combination of local area networks (LANs), wide area networks (WANs), etc. that may span one or more geographic locations, is operably coupled to one or more service provider networks, e.g., an information, communications and entertainment (ICE) service provider network 112 and one or more external communications networks 108 via suitable gateway node(s) 106A. It is envisaged that the various operations and projects of the enterprise are managed according to one or more business process flows that are established based on the enterprise's internal procedures, management objectives, tactical and strategic goals, and the like, whereby appropriate personnel, departments, business divisions, et cetera, of the enterprise are interfaced as needed at various times during the execution of a process flow for communicating and exchanging information over the enterprise network 102. Accordingly, enterprise entities such as key personnel, business divisions or departments, management information databases (e.g., accounting, financial, sales/marketing databases), information technology (IT) databases, and so on, are collectively abstracted as a plurality of resource entities 104-1 through 104-N that are suitably coupled to the enterprise network 102. One or more process flow management servers 105 are also interfaced with the enterprise network 102 for managing a particular business process in conjunction with key personnel such as project managers and other decision-makers in the enterprise. In other embodiments, the process flow management servers 105 may be disposed as part of the ICE service provider network 112.

In executing the enterprise's business processes, access may be provided via appropriate gateways to various external resources 110 such as public databases, business partners, supply-chain entities, and key third-party personnel. Although a single gateway node such as gateway 106A is illustrated for providing gateway access to external communications networks 108 and service provider network 112, it should be appreciated that any number of service gateways may be provided, depending on the type of communication involved (e.g., email, text messaging, instant messaging, voice/video/data communications, et cetera). An ICE service delivery platform 114, supported at least in part by the ICE service provider network 112, is operable to effectuate personalized, process-integrated service delivery to the enterprise by interfacing various service offerings with the process flows managed in the enterprise, wherein the enterprise resources 104-1 through 104-N and external resources 110 are placed in interactive ICE environments that are created, maintained, and terminated based on the requirements of the process flow. By way of illustration, the ICE service network 112 may be interfaced with external networks 108 via its own or third-party gateways, e.g., gateway node 106B, in the course of providing process-integrated ICE services to the enterprise.

Figure 2A:
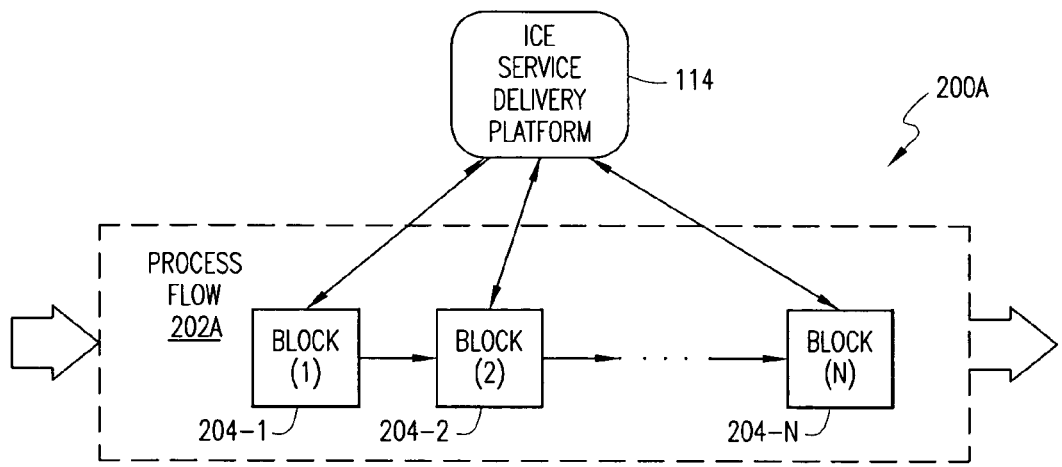
FIGS. 2A and 2B depict two exemplary high-level integration schema for invoking process-flow-dependent services according to an embodiment.
Figure 2B:
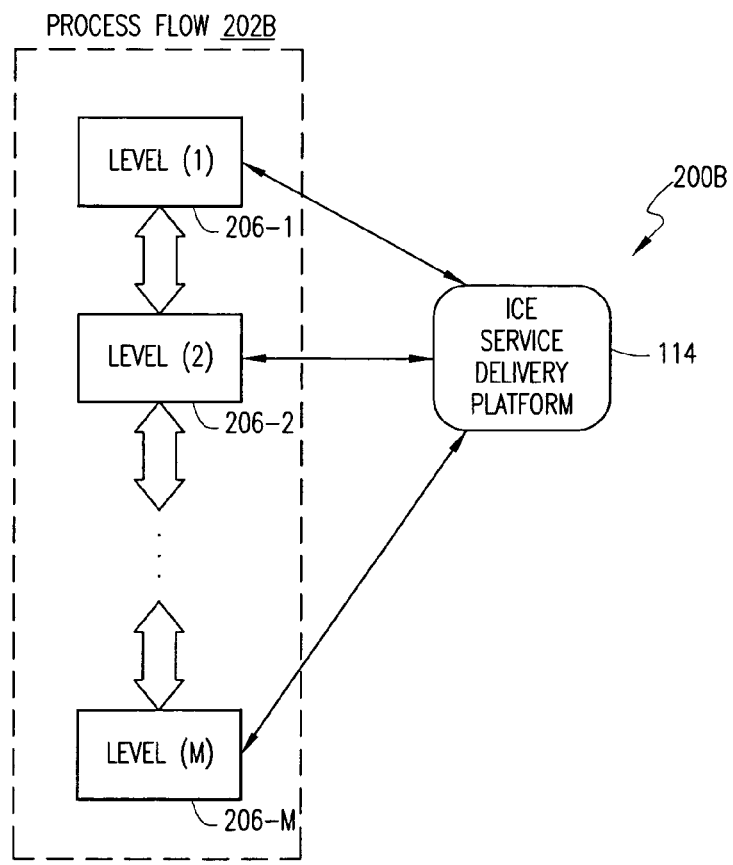

FIGS. 2A and 2B depict two exemplary high-level integration schema for invoking process-flow-dependent services according to an embodiment. Reference numeral 200A refers to a scheme where a process flow 202A is modularized into a number of process flow blocks 204-1 through 204-N, wherein one or more service application modules supported by the ICE service delivery platform 114 can interface with one or more of the process blocks for providing services that are contextualized depending on where a particular project is located in the modularized flow. Whereas the process flow 202A is horizontally modularized, it should be apparent that a process flow may also be modularized vertically or hierarchically, thereby resulting in a plurality of sub-processes at various levels. As illustrated in FIG. 2B, reference numeral 200B refers to a scheme where a process flow 202B is hierarchically arranged into M levels 206-1 through 206-M. Each of the sub-process levels may further include process flow blocks that reflect horizontal modularization therein. Analogous to the process/service integration alluded to in the foregoing, the ICE service delivery platform 114 is operable to interface various service application modules with each sub-process level for providing contextualized services.

Those skilled in the art should recognize upon reference hereto that although the process/service integration schema described hereinabove allude to business process flows in an enterprise, the teachings of the present invention may also be practiced in a residential service environment wherein contextualization of service is effectuated in terms of a process flow. For example, providing a teleconference service may be contextualized based on the parties' service profiles, device types capabilities (video/audio or audio only, for instance), content management and distribution, presence information, and the like. Furthermore, the process/service integration schema may be applied in different types of enterprises having variable complexity levels in their process flows (e.g., startups, growing companies, mature establishments, et cetera).

Figure 3:
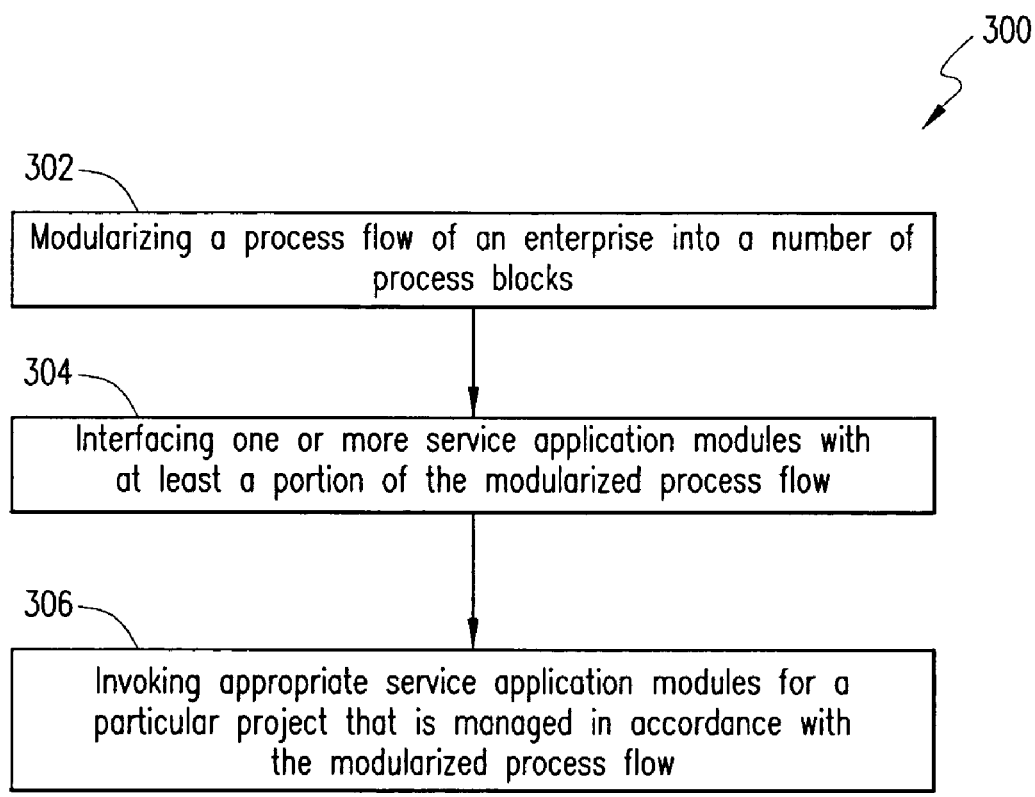
FIG. 3 is a flowchart of an exemplary embodiment of a method for providing process-integrated ICE services to a subscriber.

FIG. 3 is a flowchart associated with an exemplary embodiment of a scheme 300 for providing process-integrated ICE services to a subscriber, e.g., an enterprise. A process flow of the enterprise is modularized into a number of process flow blocks based on the enterprise's customary practice, internal procedures, input from project management, and the like (block 302). As alluded to before, each process block may involve a set of resources, both internal and external, that need interfacing in a contextualized communication environment, based at least in part upon actual projects that are managed in the enterprise. Accordingly, one or more service application modules are interfaced with at least a portion of the modularized process flow (block 304), wherein the interfacing may be effectuated based on known or heretofore unknown open service platform (OSP) architectures and suitable protocol stacks. When a particular project in the enterprise is managed based on the modularized process flow, appropriate service application modules are invoked depending on where the project is located in the flow (block 306), whereby contextualized (i.e., personalized) service or services may be instantiated.

Figure 4:
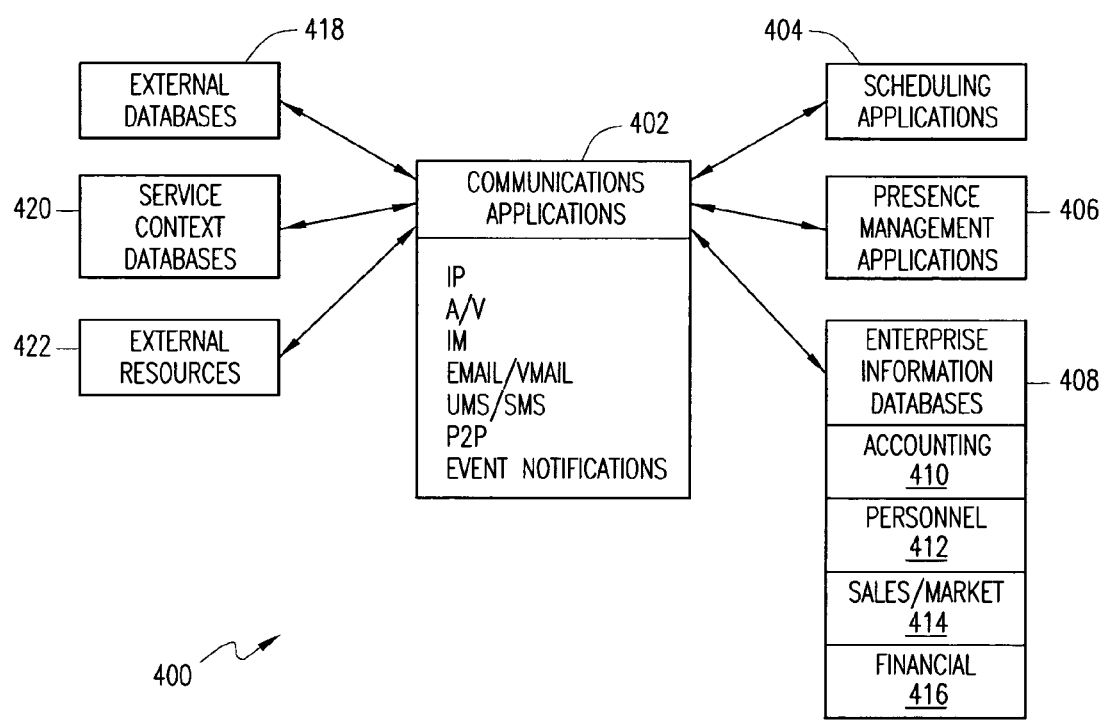
FIG. 4 depicts a functional block diagram of a resource integration scheme for activating appropriate service applications in accordance with one embodiment of the present invention.

FIG. 4 depicts a functional block diagram of a high-level resource integration scheme 400 for activating appropriate service applications in accordance with one embodiment of the present invention. A plurality of communications applications 402 supported by an OSP-based service provider network includes application modules for effectuating a number of communications such as IP communications, audio/video (A/V) communications, text/instant messaging, email and/or video mail (vmail), Short Messaging Service (SMS) and Universal Messaging Service (UMS), Peer-to-Peer (P2P) communications, event notifications, etc. Although some of these communication applications may be supported by the service provider network itself, third-party applications may also be accessed by the service provider that can be brokered on behalf of the subscriber during the execution of a project. Various scheduling applications 404, presence management applications 406 and enterprise information databases 408 are interfaced with the communications applications 402. The enterprise databases may include accounting databases 410, personnel databases 412, sales/marketing databases 414 and financial databases 416, in addition to various document repositories, internal reports and specifications, domain-specific work product databases, etc. Further, external information databases 418, service context/history databases 420, and external parties/personnel resources 422 and are also interfaced with the communications applications 402 that are hosted or brokered by the service provider network.

By way of example, an A/V teleconferencing service invoked during a project flow may be process-contextualized as set forth in the following scenario. Various entities and resources may be involved in such a context, e.g., key personnel, the enterprise's service profile, historical data, content aggregation and distribution, and the like. Associated with each of these categories are a number of factors that are utilized in personalizing the conferencing service. With respect to the parties to be involved in the conference, information relating to their domain expertise, reachability, contact lists, buddy lists, device capabilities, location, presence, group ID, access/connection capabilities, and security may be required in personalizing the service. The service profile associated with the enterprise may relate to quality, routing policies (e.g., least cost routing), wide area access/security, and the like, in addition to service arbitrage capability (i.e., whether third-party applications may be brokered on behalf of the enterprise if it is determined that they satisfy a service metric). Historical data may involve past message exchanges and/or conferences relating to the same or similar project, company financial data, current and relevant news information relating to the enterprise as well as any third-party company involved, etc. Based on the data that is available with respect to the resources and entities, a conference bridge may be set up in accordance with a scheduling application for effectuating a highly contextualized conference session among the participants.

Figure 5:
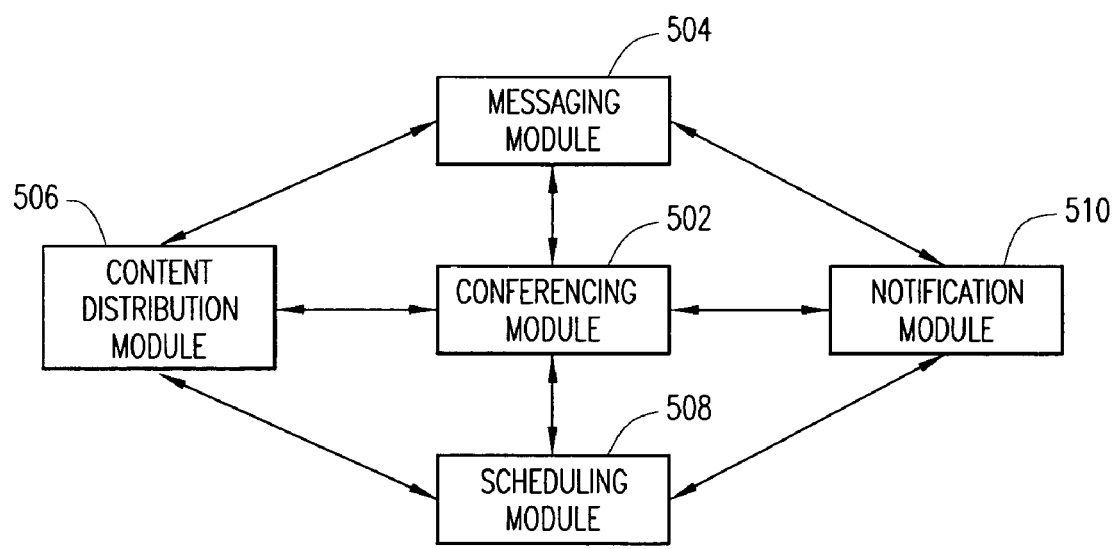
FIG. 5 depicts a functional block diagram associated with a contextualized audio/video conferencing service that involves interaction among one or more service application modules.

Based on the A/V conferencing example highlighted in the foregoing discussion, it should be seen that the architecture of a process-integrated service platform involves invoking various discrete service application modules using appropriate interfaces for effectuating a personalized service in the enterprise. By way of illustration, FIG. 5 depicts a functional block diagram associated with a contextualized A/V conferencing service that involves interaction among one or more service application modules. A conferencing module 502 is interfaced with a messaging module 504, a content distribution module 506, a context-based scheduling module 508, and a notification module, to carry out the functionality of an instantiation of a conferencing service as set forth above. Other modules can include, e.g., alerting, event generation, auto program activation, messaging, group management presence service, content or information push to users, or auto process activation, etc.

Given the flexibility and configurability of the ICE service delivery model of the present invention, it should be appreciated that a number of instantiations of the service delivery embodiments are possible within the ambit of the teachings hereof. For example, ICE realtime status (e.g., contact information, presence, availability, location, terminal/device/hardware capability) may be embedded within documents, Web pages, products (by way of suitable Universal Product Codes (UPCs) or radio frequency ID (RFID) tags), advertisements, etc., that are accessed, processed, presented, and distributed via any number of the service application modules set forth above that are adapted for a particular ICE service delivery application. Accordingly, a document that needs to reviewed for a particular meeting/conference may have embedded therein a list of reviewers with respect to that document. Upon selecting the name of a contact or reviewer (e.g., by clicking on the contact by a pointing device), the embedded ICE status can be determined and, if needed, an appropriate communication session may be established and the context of the document can be exchanged when the "call" is placed. Thus, the communication mode and context may be embedded within the document. Furthermore, the communication that is auto-triggered can share additional context history (e.g., the document or subject line may be transmitted to other participants automatically), past interactions (fax, email, IM communications relating to the subject matter of the document or the project within which the communication is contextualized), etc. In further implementations, external resources, e.g., Web sites, may be searched for relevant information from news and other media, that can be adapted for sharing with the participants, in addition to sharing relevant internal information culled from the enterprise knowledge databases.

From a residential consumer perspective, for example, embedded document delivery can allow a user to select an artist's name (e.g., a singer) in a document and view related information such as the singer's songs, Web site, personal information, sample songs, etc. Likewise, a writer's name may be linked to the writer's titles, summaries of the contents, writer's IM, locations/schedules of book tours, etc.

It should be further appreciated that an enterprise's process (es), domain/knowledge base(s), and process flow policies may be captured in any number of appropriate techniques, e.g., a flowchart, if necessary. Alternatively or additionally, the employees of the enterprise can create and "publish" their own process. Users may also adapt existing process for particular projects. Accordingly, multiple instances of the processes may be executed within an ICE service delivery system, which may involve customized service application modules or blocks (e.g., customized communication modes, wherein IM is specified for one project and email is specified for another project, or where one communication mode is specified for one portion of the project and another communication mode is specified for another portion of the same project).

Figure 6:
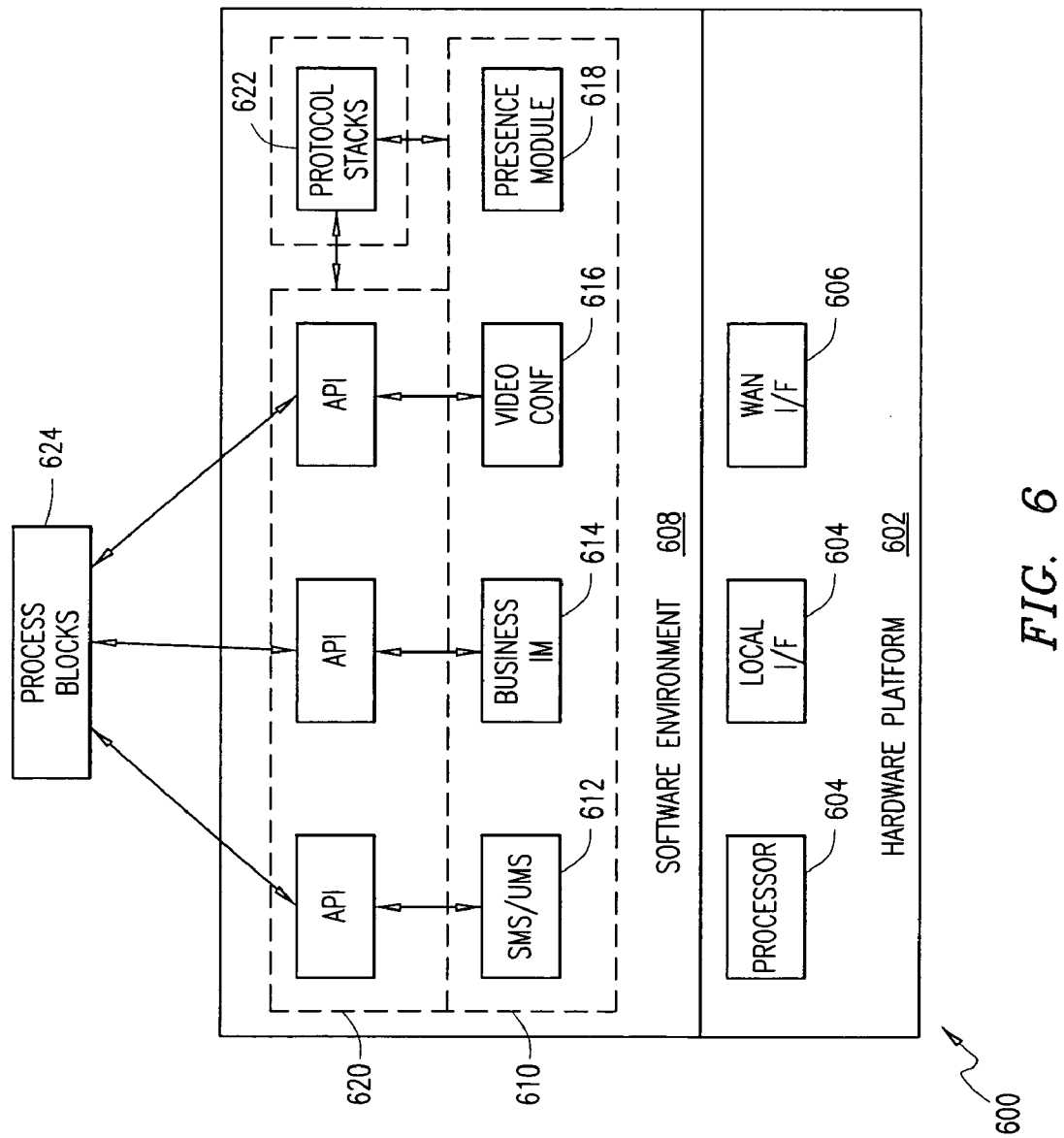
FIG. 6 depicts an exemplary embodiment of an application server for supporting ICE service delivery in accordance with the teachings of the present invention.

FIG. 6 depicts an exemplary embodiment of an application server 600 for supporting ICE service delivery in accordance with the teachings of the present invention. Those skilled in the art should recognize that an embodiment of the application server 600 may be deployed as part of a service provider network, a node in the enterprise/residential network, or a combination thereof, and may be realized in any known or heretofore unknown hardware and software architectures. As illustrated, a hardware platform 602 of the application server 600 includes one or more processors 604, one or more local network interfaces 604 and one or more wide-area network interfaces 606 for providing sufficient processing and internetworking capability. A software environment 608 includes an application space 610 and associated interface space 620 that interact with appropriate communication and application protocol stacks 622, e.g., Session Initiation Protocol (SIP), Java, Extensible Markup Language (XML), XML Schema Definition Language (XSDL), Web Services Description Language (WSDL), Simple Object Access Protocol (SOAP), Hypertext Transfer Protocol (HTTP), and the like. Exemplary applications can include SMS/UMS 612, Business IM 614, Conferencing 616, Presence 618, etc.

As described earlier in the present patent application, the process flow of an entity (enterprise, residence, etc.) may be modularized into one or more horizontal flow blocks or vertical levels, generically referred to as process blocks 624 in FIG. 6. In one implementation, the process flow and associated blocks may be supported on one or more process flow management servers disposed in the enterprise network, wherein appropriate interfacing is effectuated between the process blocks and the application programming interface (API) space 620 of the application server 600. Additional interfacing with business software such as Customer Relationship Management (CRM), Enterprise Resources Planning (ERP), Material Requirements Planning (MRP), etc., may also be provided as part of the capabilities of the application server 600. Furthermore, the overall structure and function of the application server 600 may be distributed among a plurality of servers disposed as part of a service delivery network.

By way of an example of a process-integrated service delivery application, a bid review process is set forth immediately hereinbelow. Conventionally, as an illustration, sales department of an enterprise receives a Request For Proposal (RFP) or a Request For Information (RFI) from a customer, which is submitted to proposals division that coordinates independently with multiple Business Divisions (BDs). A proposal manager is assigned, who schedules communications, calls for meetings, establishes communication/conference bridges, follows up with the project plan, coordinates response, and reviews in an iterative process. Upon arriving at a final packaging, the response is submitted back to the customer.

On the other hand, in a process-integrated communication service embodiment, the RFI/RFP is submitted to a secure hosted server in the service provider (SP) network (e.g., a Local Exchange Carrier (LEC)). It queries the sales department personnel about the deadline, basic bid information, and starts the process flow. Based on the company process and its employee database, the SP server automatically schedules time on key personnel calendars, notifies via a messaging service (e.g., SMS), and sends a secure link to the web host. Thereafter, at the appropriate time or times, the server is operable to search for employee(s) and their location, along with their service profiles (e.g., preferred communications device), and notifies them via IM/email about upcoming meetings. Subsequently, a web-based conference bridge is effectuated to which the key personnel are connected. At the end of the teleconference, the process-integrated application server is operable to gather followup meeting actions and coordinate the process till completion. In the many meetings and teleconferences, the personnel may dial in via handheld devices, mobile phones, softphones, et cetera, and the server is capable of adapting the communication stream(s) to the device capability. For example, if most of the key personnel to be involved in a particular conference are capable of video conferencing while the remaining personnel are capable of audio only, a video bridge may be set up for video conferencing for the majority of the participants, with audio bridge connectivity for the remaining personnel. If the RFI requires risk assessment and/or contingency planning by senior management or other departments (e.g., financial department), the process-integrated server has the functionality to interface with the appropriate personnel and other resources (as described in the previous sections of the present patent application) so as to effectuate personalized meeting(s), video chats, presence-based communications, and the like, in similar fashion. Where new business-critical data is generated during the processing of the RFI/RFP, the server can automatically effectuate data backup, preferably based on the enterprise's backup management/policy.

In essence, accordingly, an embodiment of the process-integrated service delivery platform is operable to schedule, establish, notify, and tear down appropriate communication bridges within the context of the process flow in an enterprise. It also links process to personnel, and adapts various communication streams to device and location. Although the process-integrated server has been exemplified as a service provider node (e.g., a LEC node), it needn't necessarily be so. As alluded to hereinbefore, an embodiment of the process-integrated service provider application server may be disposed within an enterprise network, with the appropriate interfacing to a process flow which in turn may be managed by one or more process flow management servers of the enterprise.

Figure 7:
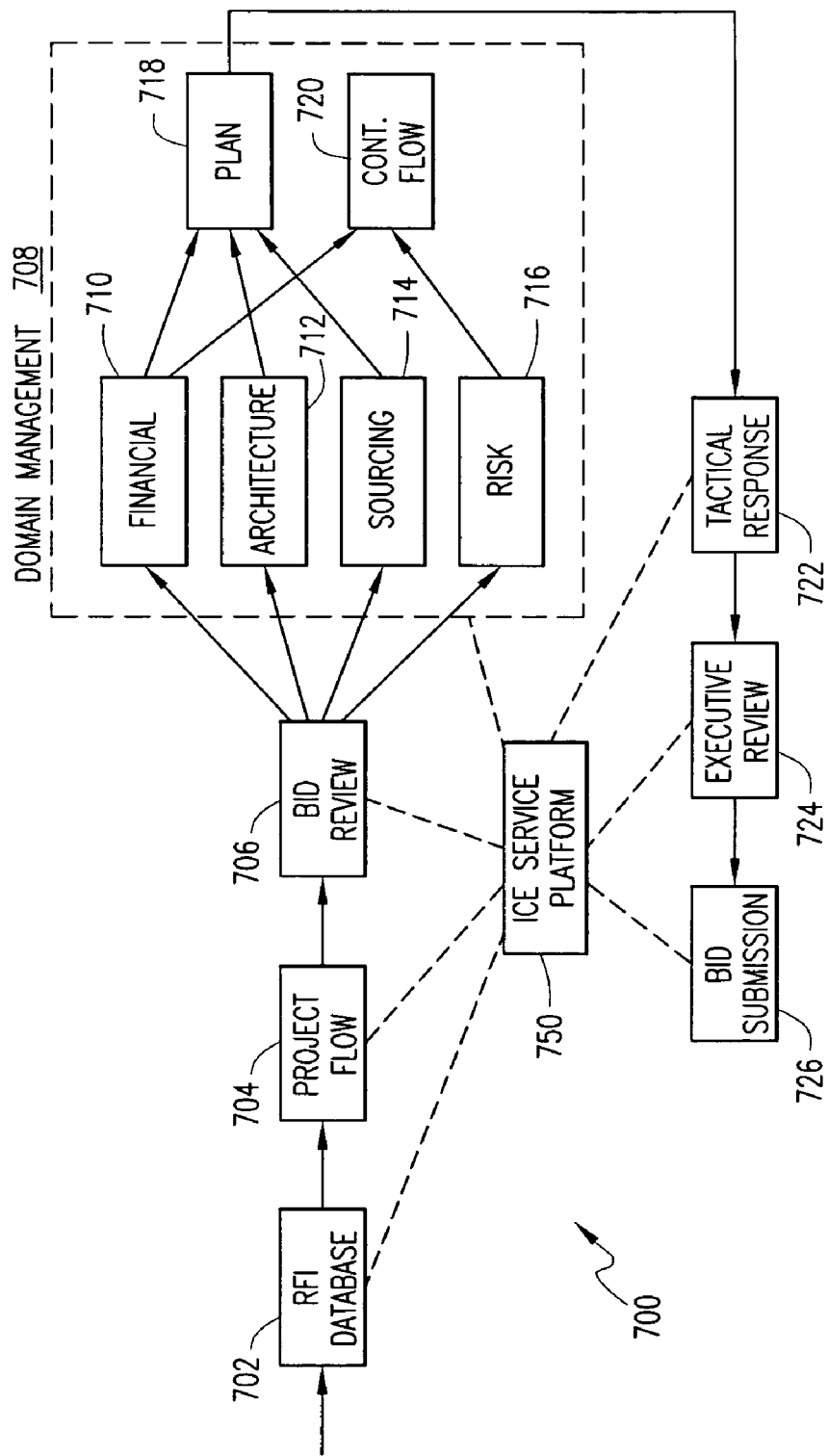
FIG. 7 depicts an exemplary business process flow that is integrated with an ICE service delivery platform in accordance with the teachings of the present invention.

FIG. 7 depicts an exemplary business flow 700 that is integrated with an ICE service delivery platform in accordance with the teachings of the present invention. As shown, the modularized process flow 700 is illustrative of the bid review process described hereinabove that manages the flow associated with a customer's RFP/RFI. An RFI/RFP database 702 is provided for storing, streamlining, and retrieving the RFI/RFP. Upon establishing an estimated project flow via block 704, a bid review block 706 interfaced with various departments of the enterprise's domain management 708 provides for one or more review iterations involving a number of resources drawn from the various departments, e.g., financial department 710, business architecture 712, supply chain sourcing 714, and risk assessment 716. ICE service delivery platform 750 interfaces with the various process flow blocks and resources for effectuating meetings, conferences, schedules, and the like, within the context of the process flow. Based on the input from one or more combinations of the departments, a contingency flow model 720 as well as a plan of execution model 718 may be established. A tactical response 722 is then formulated which is reviewed as per an executive review block 724. Responsive to the executive review block 724, a bid submission block 726 provides an RFI disposition to the customer.

Those skilled in the art should recognize that other business processes such as auditing, shareholder/analyst communications, product development and design review, et cetera, can also be modularized and integrated within an embodiment of the ICE service delivery scheme as described above. With respect to small businesses and startups, service providers can provide pre-tailored, integrated, hosted secure business process flow management as a shrink-wrapped solution that may be customized on a case by case basis. Additionally, residential service offerings may also be integrated within the context of a process flow for effectuating contextualized services.

Based on the foregoing Detailed Description, it should be appreciated that the present invention advantageously provides a process-integrated service delivery mechanism that supports delivery of value-added services by a service provider to its subscribers. The end-user enterprises gain value due to simplification, automated coordination and process-driven communication.

Since the services offered by the service provider are not only tailored to fit the enterprise's needs and budgetary constraints, but are embedded within the process flows of an enterprise, it is envisaged that the subscribers will be reluctant to migrate to other service providers.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A network system comprising:
   at least one service provider network, said at least one service provider network including an information, communications and entertainment service provider network;
   at least one information, communications and entertainment service delivery platform operably connected to the information, communications and entertainment service provider network;
   an enterprise network, said enterprise network including at least one of a local-area network and a wide area network, said enterprise network operable to be managed according to at least one first business process flow for communicating and exchanging information over said enterprise network;
   a plurality of resource entities, each of said plurality of resource entities coupled to said enterprise network;
   at least one process flow management server interfaced with said enterprise network for managing said at least one business process flow, wherein said at least one first business process flow is horizontally modularized into a plurality of discrete process flow blocks for causing at least one service application module, supported by said at least one information, communication and entertainment service delivery platform, to interface with said process flow blocks for providing services that are contextualized dependent upon where a project corresponding to said modularized business process flow is located in said modularized business process flow; and a second business process flow is modularized vertically thereby resulting in a plurality of vertically tiered sub-processes, wherein one of the plurality business processes flows includes a bid review process flow that includes a bid review process associated with a customer's request for proposal (RFP) or a bid review process associated with a customer's request for information (RFI);

hardware components of said enterprise network operably coupled to hardware components of said at least one service provider network via a gateway node thereby enabling said information, communications and entertainment service provider network to provides provide a plurality of custom services to said enterprise network based upon each of said plurality of resource entities of said enterprise network.

2. The network system as recited in claim 1, and further including at least one external communications network coupled to said enterprise network via said gateway node.

3. The network system as recited in claim 2, wherein said at least one external communications network is operably coupled to said at least one service provider network.

4. The network system as recited in claim 3, wherein said at least one external communications network includes a plurality of resources, with said plurality of resources accessible by said enterprise network during operation.

5. The network system as recited in claim 1, wherein said at least one information, communications and entertainment service delivery platform is operable to effectuate and terminate at least one of said plurality of custom services provided to said enterprise network by said information, communications and entertainment service provider based upon said at least one business process flow.

* * * * *